June 16, 1936.   H. E. HOLLMANN   2,044,003
ELECTRON DISCHARGE DEVICE CIRCUIT
Filed March 8, 1934

INVENTOR
HANS ERICH HOLLMANN
BY *H. G. Grover*
ATTORNEY

Patented June 16, 1936

2,044,003

UNITED STATES PATENT OFFICE

2,044,003

ELECTRON DISCHARGE DEVICE CIRCUIT

Hans Erich Hollmann, Berlin, Germany, assignor to Telefunken Gesellschaft fur Drahtlose Telegraphie m. b. H., Berlin, Germany, a corporation of Germany Application March 8, 1934, Serial No. 714,652
In Germany March 8, 1933

2 Claims. (Cl. 250—27)

It is well known that, ordinarily, the input circuit of a normally connected tube, in other words, the grid-filament path is connected with the terminals of a tuned parallel resonance circuit. This is readily permissible since the resistance of the grid-cathode path is so high that no appreciable damping of the resonance circuit and an impairment of selectivity will be brought about. As applied to a retarding field circuit arrangement (a circuit functioning in the Barkhausen-Kurz or Gill-Morrell manner wherein the grid is at a high positive potential and the anode at zero, a small positive potential or even at a negative potential with respect to the cathode) it has heretofore been usual in the art to connect the path between retarding electrode (anode or plate) and the filament in parallel relation to such a tuned circuit. Such a retarding field circuit, it is to be understood, is not confined solely to ultra short wave uses. In this connection, however, it has been found to be troublesome that the internal resistance of a retarding field tube is low (of an order of magnitude less than 1000 ohms), and that as a consequence there occurs a marked damping of the resonance circuit. Hence, according to the present invention it is suggested to connect the retarding field electrode in the current loop of the source of potential, i. e., an antenna or an oscillation circuit, rather than to connect the same in parallel relation to a resonance system in which latter instance, as will be clear, the voltage loop would arise between what was called the retarder electrode and the filament. In fact, in this instance, a low internal resistance of the tube would be very desirable, and the use of a distinct matching transformer would thus become superfluous.

Figure 1:
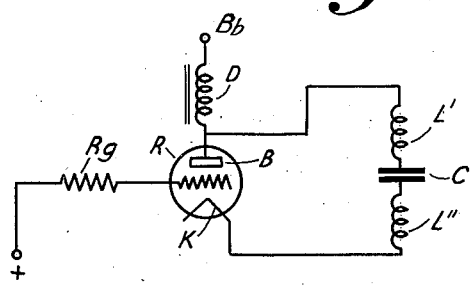
Figure 2:
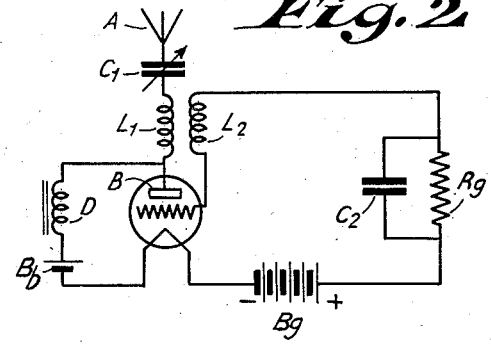
Figure 3:
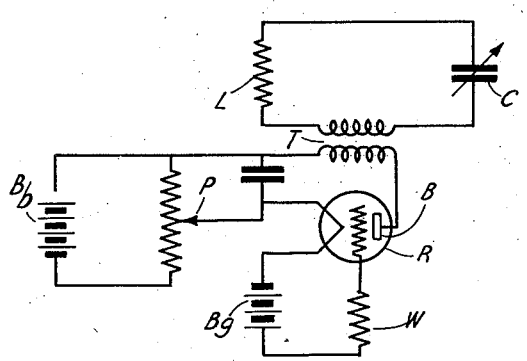
Figure 4:
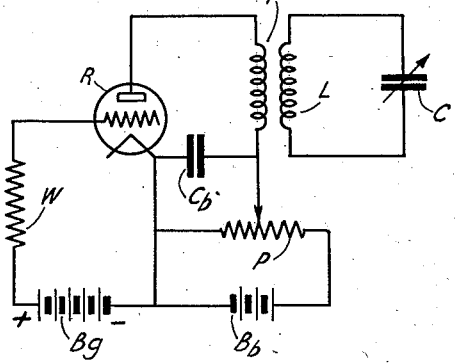
Figure 5:
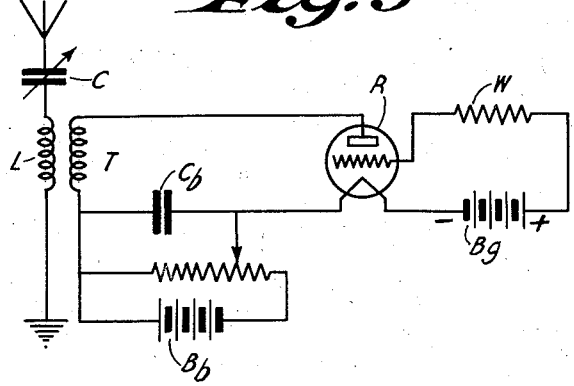

Figures 1 and 2 show two embodiments of the invention as applied to a tube of the so-called braking type having a low input resistance. Figures 3 to 5 show an improvement over the circuits of Figures 1 and 2 in order to overcome difficulties outlined later in the specification.

Figure 1 is a practical embodiment of the invention showing how the same is connected in the current loop of a resonant circuit. R denotes the braking or retarder tube whose grid is fed with a high positive potential having as its load the output resistance Rg, as well known. The internal braking resistance between the retarding electrode B and the cathode lies in the current loop of an oscillation circuit. Externally of the tube this circuit includes a capacitance C and the two inductances L' and L''. Hence, the normal resonance current flows through the tube and it is therefore in current coupling relation. The brake biasing potential Bb required for the operation of the braking tube is supplied by way of a choke coil D.

Another embodiment of the basic idea of the invention is shown in Figure 2 which is a receiving scheme with demodulation means and resistance transformation by a current coupled braking tube. In the current loop of the receiving antenna A which is tuned by way of the condenser C1 and the inductance L there also exists the internal braking resistance, the braking electrode B being given the requisite biasing voltage by way of the choke coil D. By shifting the operating point to the lower or the upper knee of the braking characteristic, demodulation voltages may be obtained across the output resistor Rg. The residual radio frequency energy is drained by way of a blocking condenser C2.

In order to cause regeneration in the receiver the radio frequency energy flowing in the output circuit could be returned to the input circuit in any desired manner, and this is indicated in the circuit arrangement of Figure 2 by an inductive feedback of the coil L2 to the antenna inductance L1. By means of this feedback the sensitiveness of the current coupled tube receiver may be increased in a well known manner without losing the advantages to be derived from the use of the braking tube.

In an analogous manner the basic idea of the invention is applicable also to multi-stage receiving and amplifier arrangements where each individual tube is in current coupling relationship with the respective input circuit. By keeping in mind the phase sense of the feedback it is possible to apply the feedback energy to several stages of such a multi-stage receiver.

In carrying out the invention, it is also desirable to control the damping by the series resistance which is preferably included in the resonance circuit. In order that this damping may not be too great, the internal input resistance of the tube should be as low as possible; indeed, it should not be greater than a few ohms. This requirement could be fulfilled according to the prior art only by obtaining a very high emission, such as would imply large energy losses in the tube.

Now, this difficulty is overcome in a simple way by the present invention in that the electron tube having inherently a low input resistance is not included directly in the oscillation circuit, but is coupled with the circuit by way of a transformer.

Figure 3 shows a practical embodiment of the basic idea of this feature of the invention. Referring to the same, CL is the receiving circuit proper with which the "retarding field" (short wave Barkhausen-Kurz) tube R is coupled by way of transformer T. The ratio of transformation of T according to this invention is so chosen, and the value of the internal resistance between the cathode and the "retarding" anode is maintained within such low limits, preferably a few hundred ohms, that only about ten per cent of the energy will be transferred to the oscillation circuit. The undesirable damping does not occur under these conditions. The transformer T thus insures extensive adaptation of the two apparent resistances (impedances) and complete ultilization of the short wave tube. In order that the working point may be adjusted at will along the characteristic, the retarding electrode B is furnished with a suitable biasing voltage by means of the battery $B_b$ in series with the secondary winding of the transformer T, the said battery being conveniently shunted by the blocking capacity $C_b$, or else the said biasing potential is obtained by the voltage divider P. The grid electrode is united by way of the useful resistance W with the battery $B_g$ furnishing the positive working voltage.

It will be understood that the inductance L of the oscillation circuit could be designed to play the part of the primary winding of transformer T, as shown in Figure 4.

Figure 5 shows a circuit arrangement in which the input circuit is replaced by a receiving aerial comprising tuning condenser C and coupling coil L, the latter again constituting the primary winding of the transformer T.

In all cases an auto-type of transformer could be employed in lieu of a transformer comprising two windings, such auto-transformer consisting of only one winding with taps.

I claim:

1. A receiver circuit having, in combination, an electron discharge device having a grid, anode and cathode, means for maintaining said grid at a high positive potential and said anode at a relatively lower potential with respect to said cathode, an output circuit connected between said grid and cathode, an input circuit, a path between said anode and cathode, and means for coupling said path to a current anti-node of said input circuit whereby the device is in current coupling relationship with the input circuit, said means comprising a transformer for matching the internal input resistance of the device to the resistance of the input circuit.

2. In combination, an electron discharge device having a grid, anode, and cathode, and wherein the impedance between said anode and cathode is low, means for maintaining said grid at a high positive potential and said anode at a relatively lower potential with respect to said cathode, a load connected between said grid and cathode, a source of signals, and means for so coupling said anode and cathode to points on said source as to obtain an impedance match externally and internally of the tube.

HANS ERICH HOLLMANN.